US010956026B2

(12) United States Patent
Cao et al.

(10) Patent No.: US 10,956,026 B2
(45) Date of Patent: *Mar. 23, 2021

(54) SMART ELEMENT FILTERING METHOD VIA GESTURES

(71) Applicant: INTERNATIONAL BUSINESS MACHINES CORPORATION, Armonk, NY (US)

(72) Inventors: Shuai Cao, Shanghai (CN); Run Hua Chi, Shanghai (CN); Zhen Hong Ding, Shanghai (CN); Xu Jun Ge, Shanghai (CN); Nan Song, Shanghai (CN); Yi Chen Zhang, Shanghai (CN); Chao Zheng, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 126 days.

This patent is subject to a terminal disclaimer.

(21) Appl. No.: 15/834,177

(22) Filed: Dec. 7, 2017

(65) Prior Publication Data

US 2018/0373422 A1    Dec. 27, 2018

Related U.S. Application Data

(63) Continuation of application No. 15/633,961, filed on Jun. 27, 2017, now Pat. No. 10,521,106.

(51) Int. Cl.
*G06F 3/01* (2006.01)
*G06F 3/0488* (2013.01)
(Continued)

(52) U.S. Cl.
CPC .......... *G06F 3/04883* (2013.01); *G06F 3/017* (2013.01); *G06F 3/04845* (2013.01);
(Continued)

(58) Field of Classification Search
CPC combination set(s) only.
See application file for complete search history.

(56) References Cited

U.S. PATENT DOCUMENTS 6,605,120 B1    8/2003    Fields et al.
6,701,350 B1    3/2004    Mitchell
(Continued)

FOREIGN PATENT DOCUMENTS

| CN | 103810193 A | 5/2014 |
|---|---|---|
| EP | 2232357 B1 | 5/2016 |
| WO | 2012022044 A1 | 2/2012 |

OTHER PUBLICATIONS

Ahmadi et al., "User-Centric Adaptation of Web Information for Small Screens," Journal of Visual Languages & Computing, Feb. 2012, p. 13-28, vol. 23, Issue 1, Elsevier Ltd.

(Continued)

*Primary Examiner* — Hien L Duong
(74) *Attorney, Agent, or Firm* — Alexis N. Hatzis

(57) ABSTRACT

A method, computer system, and a computer program product for filtering at least one element. The present invention may include receiving a user gesture. The present invention may also include determining a requested action based on the received user gesture. The present invention may then include filtering at least one element associated with a webpage based on the determined requested action. The present invention may further include rendering a modified webpage based on the filtered at least one element.

7 Claims, 11 Drawing Sheets

(51) Int. Cl.
*G06F 8/34* (2018.01)
*G06F 3/0484* (2013.01)
*G06F 40/14* (2020.01)
*G06F 16/957* (2019.01)

(52) U.S. Cl.
CPC ............... *G06F 8/34* (2013.01); *G06F 40/14* (2020.01); *G06F 16/957* (2019.01)

(56) References Cited

U.S. PATENT DOCUMENTS

| | | |
|---|---|---|
| 6,763,388 B1 | 7/2004 | Tsimelzon |
| 6,938,205 B1 | 8/2005 | Hanson et al. |
| 6,993,707 B2 | 1/2006 | Baker et al. |
| 6,996,768 B1 | 2/2006 | Elo et al. |
| 7,085,994 B2 | 8/2006 | Gvily |
| 7,415,538 B2 | 8/2008 | Maes et al. |
| 7,562,181 B2 | 7/2009 | Sinclair et al. |
| 7,581,173 B1 | 8/2009 | Ferguson et al. |
| 7,590,795 B2 | 9/2009 | Sinclair et al. |
| 7,610,437 B2 | 10/2009 | Sinclair et al. |
| 8,174,502 B2 | 5/2012 | Bolsinga |
| 8,862,985 B2 | 10/2014 | Gallo et al. |
| 9,003,298 B2 | 4/2015 | Hoke et al. |
| 9,690,381 B2 | 6/2017 | Levesque et al. |
| 9,792,013 B2 | 10/2017 | Fleizach et al. |
| 9,847,079 B2 | 12/2017 | Clement et al. |
| 10,521,106 B2 | 12/2019 | Cao |
| 2002/0105537 A1 | 8/2002 | Orbanes et al. |
| 2004/0177148 A1 | 9/2004 | Tsimelzon, Jr. |
| 2005/0046901 A1 | 3/2005 | Silverbrook et al. |
| 2005/0071783 A1* | 3/2005 | Atkins ............... G06T 11/60 715/851 |
| 2005/0268247 A1 | 12/2005 | Baneth |
| 2007/0033377 A1 | 2/2007 | Sinclair et al. |
| 2007/0033378 A1 | 2/2007 | Sinclair et al. |
| 2007/0186032 A1 | 8/2007 | Sinclair et al. |
| 2007/0198916 A1* | 8/2007 | Rohrabaugh ......... G06F 40/103 715/234 |
| 2007/0288247 A1 | 12/2007 | Mackay |
| 2008/0059480 A1 | 3/2008 | Lee et al. |
| 2008/0094371 A1 | 4/2008 | Forstall et al. |
| 2008/0196046 A1 | 8/2008 | Athas et al. |
| 2008/0215965 A1 | 9/2008 | Abrams |
| 2009/0128505 A1 | 5/2009 | Partridge |
| 2009/0138810 A1 | 5/2009 | Howard et al. |
| 2009/0225037 A1* | 9/2009 | Williamson ........ G06F 3/04883 345/173 |
| 2009/0225038 A1* | 9/2009 | Bolsinga ............ G06F 3/04883 345/173 |
| 2009/0225039 A1* | 9/2009 | Williamson ........ G06F 3/04883 345/173 |
| 2009/0303204 A1* | 12/2009 | Nasiri ................... G06F 3/0346 345/184 |
| 2010/0185689 A1 | 7/2010 | Hu et al. |
| 2010/0251143 A1 | 9/2010 | Thomas et al. |
| 2010/0309147 A1 | 12/2010 | Fleizach et al. |
| 2010/0313107 A1 | 12/2010 | Hikida |
| 2011/0022945 A1 | 1/2011 | Yang |
| 2011/0082850 A1 | 4/2011 | Ball |
| 2011/0154225 A1* | 6/2011 | Martin ................... G06F 17/24 715/760 |
| 2011/0209046 A1 | 8/2011 | Huang et al. |
| 2011/0252346 A1 | 10/2011 | Chaudhri |
| 2011/0254792 A1* | 10/2011 | Waters .................. G06F 1/1626 345/173 |
| 2011/0258538 A1 | 10/2011 | Liu et al. |
| 2011/0302510 A1 | 12/2011 | Harrison et al. |
| 2012/0047431 A1 | 2/2012 | Hauser |
| 2012/0131519 A1 | 5/2012 | Jitkoff |
| 2012/0173963 A1 | 7/2012 | Hoke et al. |
| 2012/0174121 A1* | 7/2012 | Treat ....................... G06F 9/542 719/318 |
| 2012/0327009 A1 | 12/2012 | Fleizach |
| 2013/0145240 A1 | 6/2013 | Anderson et al. |
| 2013/0145255 A1 | 6/2013 | Zheng et al. |
| 2013/0155463 A1 | 6/2013 | Jin et al. |
| 2013/0198603 A1 | 8/2013 | Gokhman et al. |
| 2013/0222274 A1* | 8/2013 | Mori ....................... B60K 37/06 345/173 |
| 2013/0238978 A1 | 9/2013 | Jwa et al. |
| 2014/0165000 A1 | 6/2014 | Fleizach et al. |
| 2014/0189480 A1 | 7/2014 | Newman et al. |
| 2014/0215310 A1* | 7/2014 | Kim .................... G06F 3/04883 715/234 |
| 2014/0215398 A1 | 7/2014 | Fleizach et al. |
| 2014/0282115 A1 | 9/2014 | Balogh et al. |
| 2014/0325448 A1* | 10/2014 | Han ........................ G06F 9/452 715/835 |
| 2014/0330650 A1* | 11/2014 | Karmarkar ......... G06Q 30/0269 705/14.66 |
| 2014/0380149 A1 | 12/2014 | Gallo et al. |
| 2015/0067476 A1 | 3/2015 | Song et al. |
| 2015/0067560 A1 | 3/2015 | Cieplinski et al. |
| 2015/0149916 A1 | 5/2015 | Mendez et al. |
| 2015/0178253 A1* | 6/2015 | Kim ....................... G06F 17/212 715/234 |
| 2015/0185835 A1 | 7/2015 | Ma et al. |
| 2015/0220248 A1 | 8/2015 | Ording et al. |
| 2015/0227566 A1 | 8/2015 | Tanaka et al. |
| 2016/0041954 A1 | 2/2016 | Bloch et al. |
| 2016/0054799 A1 | 2/2016 | Levesque et al. |
| 2016/0103928 A1 | 4/2016 | Glasgow et al. |
| 2016/0140626 A1 | 5/2016 | Agarwal et al. |
| 2016/0147725 A1 | 5/2016 | Patten et al. |
| 2016/0188181 A1 | 6/2016 | Smith |
| 2016/0357389 A1 | 12/2016 | Dakin |
| 2017/0060363 A1 | 3/2017 | Luu et al. |
| 2017/0212875 A1 | 7/2017 | Foresti |
| 2017/0228122 A1 | 8/2017 | Levesque et al. |
| 2017/0286368 A1 | 10/2017 | Osindero et al. |
| 2017/0330545 A1 | 11/2017 | Clement et al. |
| 2018/0341627 A1* | 11/2018 | Moldovean ......... G06F 16/9027 |
| 2018/0373421 A1 | 12/2018 | Cao |

OTHER PUBLICATIONS

Chen et al., "Adapting Web Pages for Small-Screen Devices," IEEE Internet Computing, Jan.-Feb. 2005, p. 50-56, vol. 9, Issue 1, IEEE Computer Society.

Mell et al., "The NIST Definition of Cloud Computing," National Institute of Standards and Technology, Sep. 2011, p. 1-3, Special Publication 800-145.

Xiao et al., "Web Page Adaptation for Mobile Device," 4th International Conference on Wireless Communications, Networking and Mobile Computing (WiCOM '08), Oct. 12-14, 2008, p. 1-5, IEEE.

Zhang, "Web Content Adaptation for Mobile Handheld Devices," Communications of the ACM, Feb. 2007, p. 75-79, vol. 50, Issue 2, ACM.

IBM, "List of IBM Patents or Patent Applications Treated as Related (Appendix P)," Apr. 11, 2018, p. 1-2.

Cao et al., "Smart Element Filtering Method via Gestures," Application and Drawings, Filed on Jun. 27, 2017, 38 Pages, U.S. Appl. No. 15/633,961.

Cao et al., "Smart Element Filtering Method via Gestures," Application and Drawings, Filed on Feb. 1, 2018, 34 Pages, U.S. Appl. No. 15/885,864.

IBM, "List of IBM Patents or Patent Applications Treated as Related (Appendix P)," Jun. 17, 2020, p. 1-2.

* cited by examiner

SMART ELEMENT FILTERING METHOD VIA GESTURES

BACKGROUND

The present invention relates generally to the field of computing, and more particularly to web element filtering.

Mobile devices have become very popular for daily use. When browsing a webpage on a mobile device, it is not possible for a user to choose elements of the webpage that the user wishes to see and eliminate those elements which the user does not. In general, there are many unwanted elements which are of no interest to the user and which occupy portions of the limited mobile screen space. In order to view only elements which the user is interested in, the user's option is to close those browsers which display content that the user does not wish to see. The user does not have the ability to delete elements from a particular webpage which are of no interest, in order to focus on displaying elements which are of interest.

SUMMARY

Embodiments of the present invention disclose a method, computer system, and a computer program product for filtering at least one element. The present invention may include receiving a user gesture. The present invention may also include determining a requested action based on the received user gesture. The present invention may then include filtering at least one element associated with a webpage based on the determined requested action. The present invention may further include rendering a modified webpage based on the filtered at least one element.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
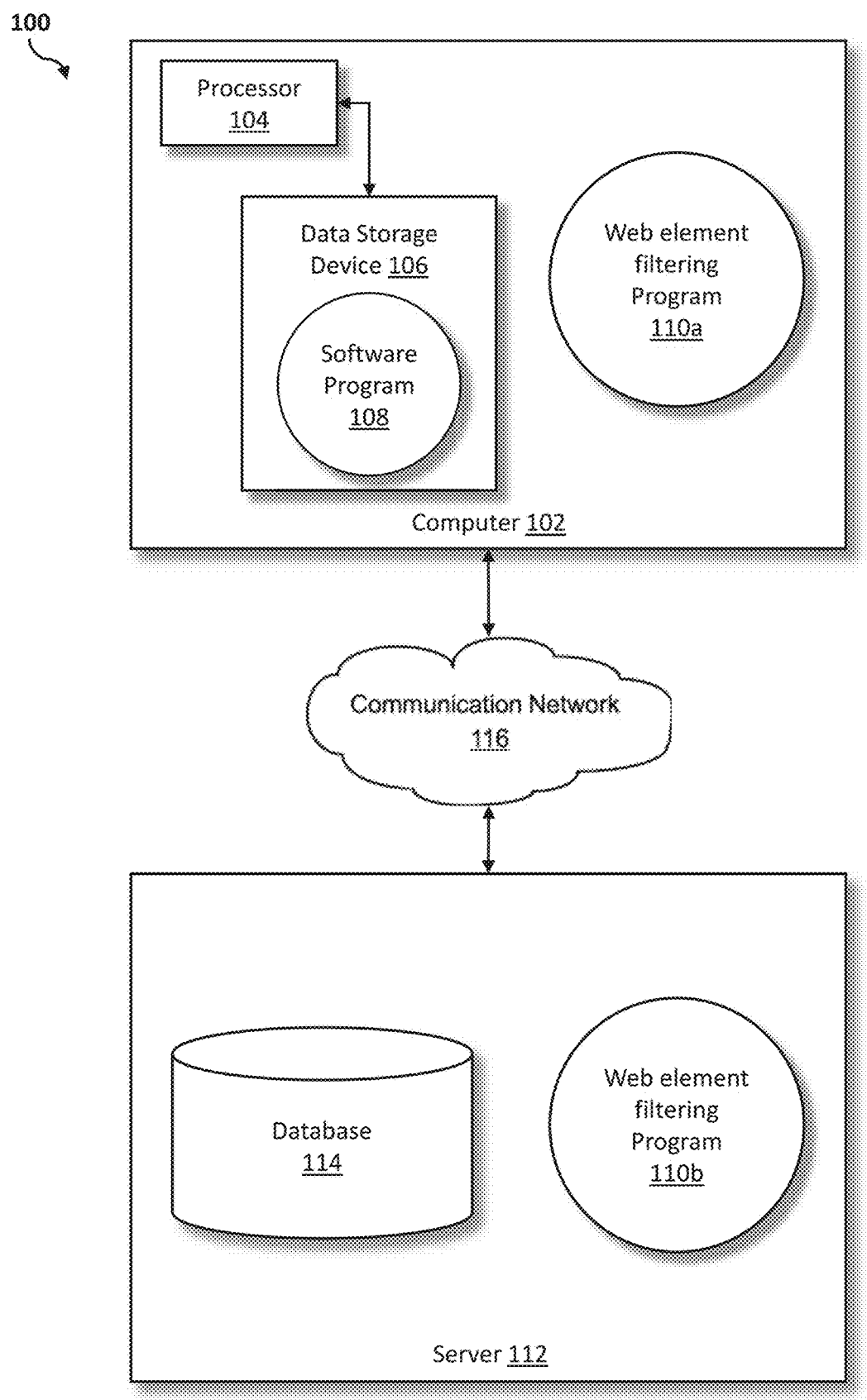
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for web element filtering. As such, the present embodiment has the capacity to improve the technical field of web element filtering by using the shake gesture to filter webpage elements on mobile devices. More specifically, the filtering may be done automatically by filtering document object models (i.e., DOMs) with similar hypertext markup language (i.e., html) element, class, style or level attributes, by filtering similar shape structures, or by predefined filtering levels set by the implementer of the web element filtering program. The filtering may also be done manually by user selection and shake gesture, whereby the user can select an element or element group that he wishes to remain and shake to gradually filter elements in batches. The user's pressure may be used to adjust the scope of filtered elements. Retained elements may be enlarged to fit the screen size and optimize the user's display.

As described previously, mobile devices have become very popular for daily use. When browsing a webpage on a mobile device, a user cannot choose elements of the webpage that the user wishes to see and eliminate those elements which the user does not. In general, there are many unwanted elements which are of no interest to the user and which occupy portions of the limited mobile screen space. In order to view only elements which the user is interested in, the user's option is to close the browsers which display content that the user does not wish to see. The user does not have the ability to delete elements from a webpage which are of no interest to the user, in order to focus on displaying elements which are of interest.

Therefore, it may be advantageous to, among other things, provide a way to enable a user of a mobile device to filter elements on a webpage that the user does not wish to see and only display content which is of interest to the user.

According to at least one embodiment, the user of a mobile device may filter out unwanted elements on a webpage viewed by the user by using gestures which may be interpreted by sensors on the mobile device. The implementer of the program may configure the meaning that each gesture may have, and may further define filtering categories within the program. The filtering category may determine the method by which other elements on the webpage are determined to be related or unrelated to a selected portion.

The present embodiment may include a user using a press gesture to select a portion of the viewed webpage, indicating to the web element filtering program that the selected content is desirable, and the user subsequently using a shake gesture to filter out all unrelated and unwanted elements from the viewed webpage. The user may determine whether content should be retained or removed from the webpage. The user may choose to select additional elements and perform additional filtering, or may use a return gesture to remove any existing filtering and return the webpage to its original format.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a web element filtering program 110a. The networked computer environment 100 may also include a server 112 that is enabled to run a web element filtering program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 9, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114.

According to various implementations of the present embodiment, the web element filtering program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the web element filtering program 110a, 110b (respectively) to filter webpage content based on a user's selection of desirable content appearing on the webpage. The web element filtering method is explained in more detail below with respect to FIGS. 2-8.

Figure 2:
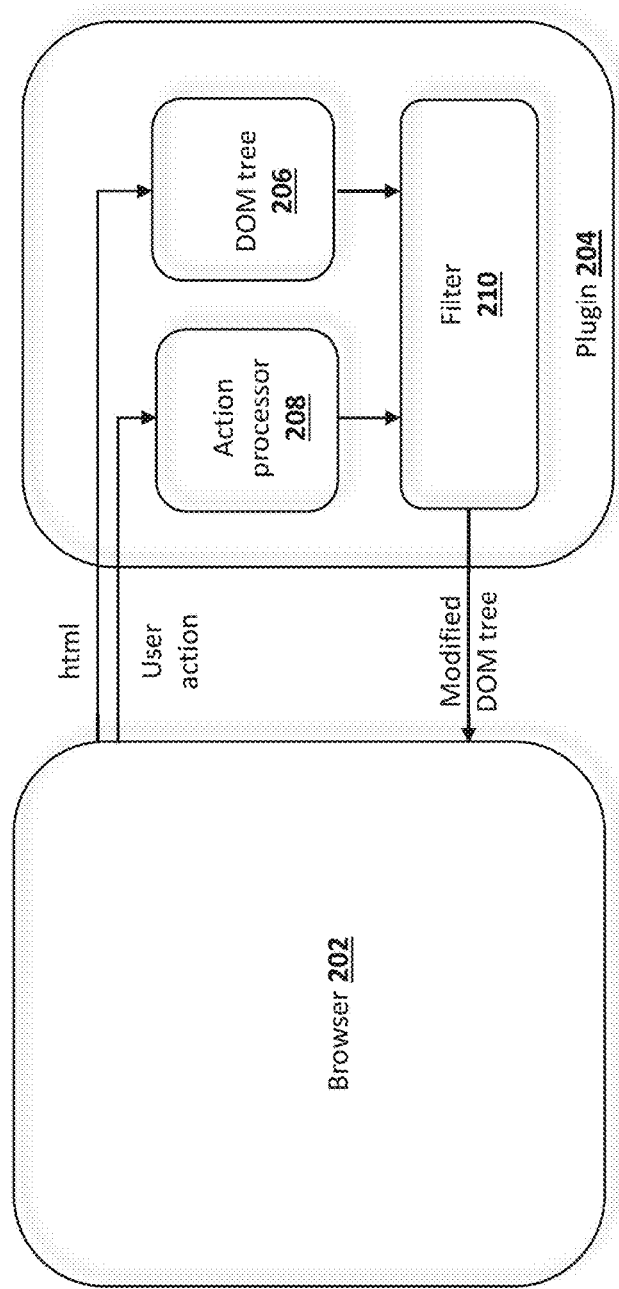
FIG. 2 illustrates the system architecture of the web element filtering program.

Referring now to FIG. 2, an illustration of the system architecture 200 of the web element filtering program 110a, 110b according to at least one embodiment is depicted. The web element filtering program 110a, 110b may be built, for example, as either a plugin or a backend operating system service which may monitor user input (e.g., pressing, shaking or returning), analyze a DOM tree or change the DOM tree and re-render a webpage.

The system architecture 200 of the web element filtering program 110a, 110b includes a browser 202, a plugin 204, a DOM tree 206, an action processor 208, and a filter 210. The browser 202 may provide html source files and user actions to the plugin 204. The browser 202 may further monitor user actions and display returned outputs after web element filtering is complete. The plugin 204 may interact with the browser 202 via specifications set forth in an application program interface (i.e., API). The plugin 204 may contain three processing modules: the DOM tree 206, which may parse source code such as html into functional elements; the action processor 208, which may extract user actions (e.g., shake gesture and return gesture) and convert them into events, and thereafter, convert the events into filtering level values or element attributes; and the filter 210, which may calculate and match the generated level values or element attributes with the corresponding DOM tree elements. The filter 210 may filter out elements on the DOM tree 206 and the plugin 204 may thereafter feed the browser 202 the modified DOM tree to enable the browser 202 to re-render the webpage.

Figure 3:
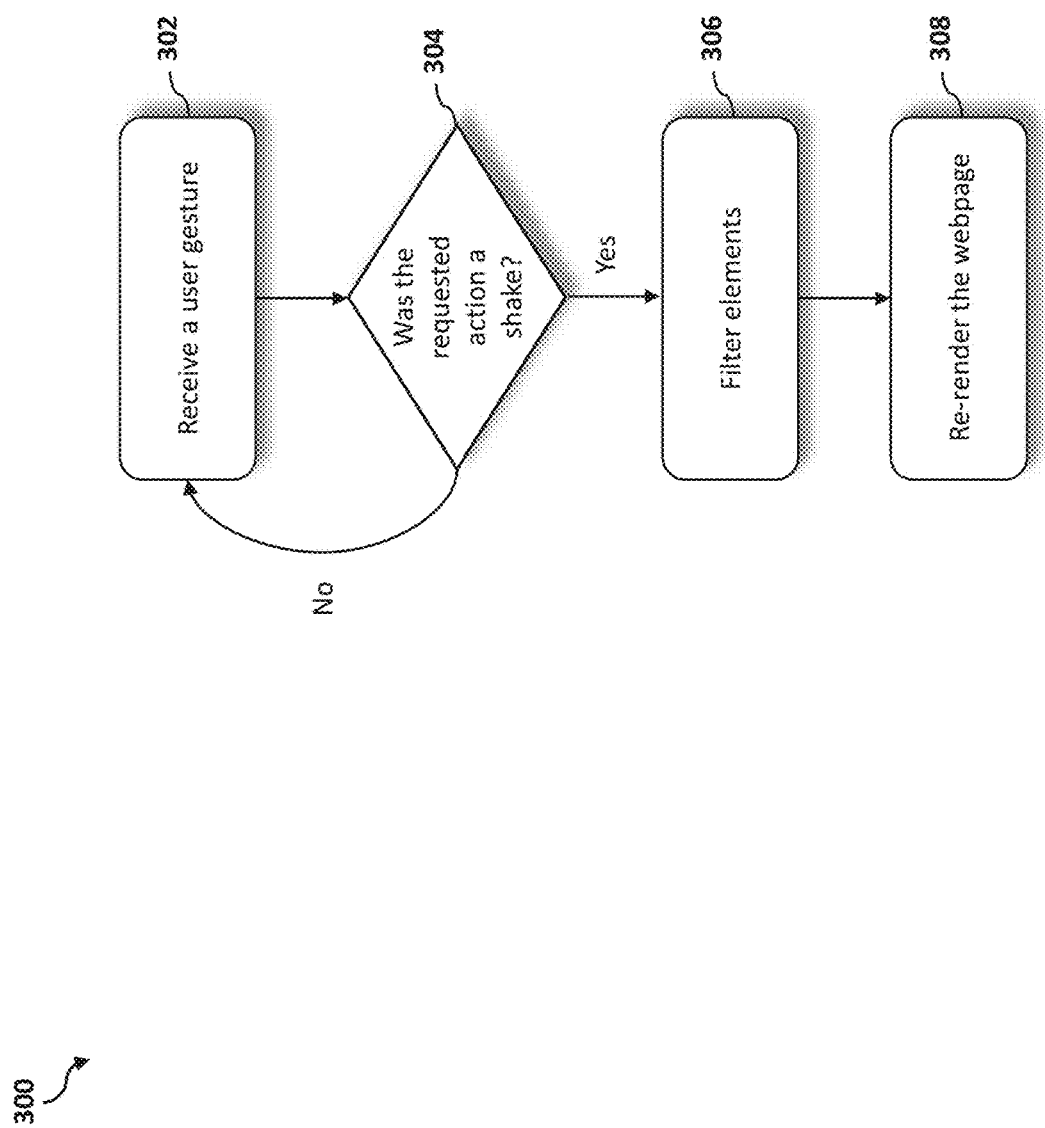
FIG. 3 is an operational flowchart illustrating a process for web element filtering according to at least one embodiment.

Referring now to FIG. 3, an operational flowchart illustrating a web element filtering process 300 according to at least one embodiment is depicted.

At 302, a user gesture is received by a plugin 204 while a webpage is viewed on a mobile device (e.g., client computer 102). The user gesture generated by the user is read by a sensor located within the mobile device. The webpage being viewed may be a well formatted hypertext markup language (i.e., html) webpage with a clear Document Object Model (i.e., DOM) tree structure. The DOM may be a language-independent programming interface that parses the html source code of the viewed webpage to create a tree structure from the html webpage. Each element in the tree may represent a part of the html webpage. When an html webpage is rendered on a mobile device, the browser 202 may download the html source code into a local memory source and parse the DOM tree to display the webpage on the screen.

At 304, the requested user action is determined. The plugin 204 running the web element filtering program 110a, 110b may use sensors within the mobile device to classify the received gesture as a press gesture, a shake gesture or a return gesture. The plugin 204 may then convert each gesture into a corresponding action for the web element filtering program 110a, 110b to process. If the gesture is determined to be a press gesture, then the plugin 204 may identify the portion of the DOM tree 206 affected by the press gesture and may, for example, store the identified portion of the DOM tree 206 in a temporary memory location (e.g., cache memory). A location in temporary memory may be created simultaneously with the user's press gesture. On the user's mobile device, the identified portion of the DOM tree 206 may appear with dotted borders to enable the user to identify whether the selection is accurate. The user's pressure may be adjusted to modify the scope of filtered elements. If the user presses on a portion of the DOM tree 206 and holds down the press, then the pressed portion of the DOM tree 206 and that portion's children nodes in the DOM tree 206 may be selected and stored in temporary memory. Additional requests may be received by the plugin 204 at 302 after the user's first requested action is determined.

If a second user gesture is received by the plugin 204 as described previously at 302, the gesture will be determined by the plugin 204 described previously at 304. If the second gesture is determined to be a shake, then the mobile device may have been shaken by the user. If the second gesture is determined to be a return, then the user of the mobile device may have performed the return gesture (e.g., drawing the phone down towards the user and standing the phone back up again). The implementer of the web element filtering program 110a, 110b may specify the return gesture used. The implementer may further specify whether a single return gesture will bring back all content previously removed from the webpage with one or more iterations, or whether multiple return gestures may be encoded in the web element filtering program 110a, 110b.

At 306, elements are filtered from the webpage. In response to a shake gesture, the web element filtering program 110a, 110b may eliminate elements (i.e., nodes) from the DOM tree 206 which are not stored in temporary memory or determined to be equivalent to those stored in temporary memory based on a predefined filtering category (e.g., DOM attribute, DOM tree layer, or shape of selected DOM). In response to a return gesture received by the web element filtering program 110a, 110b, the pressed portion of the DOM tree 206 stored in temporary memory may be deleted and the DOM tree 206 may return to the original form associated with the viewed webpage. Several filtering methods will be described in more detail below with respect to FIGS. 4-8.

Finally, at 308, the webpage is re-rendered. If a portion of the DOM tree 206 was pressed and a shake gesture was received, as described previously at 302 and 304, then elements which were removed from the DOM tree 206 by the web element filtering program 110a, 110b, as described previously at 306, may no longer appear. If a return gesture was received, as described previously at 302, then the webpage will contain all elements. After rendering a modified version of the webpage, additional user gestures may be received by the plugin 204 as described previously at 302.

Figure 4B:
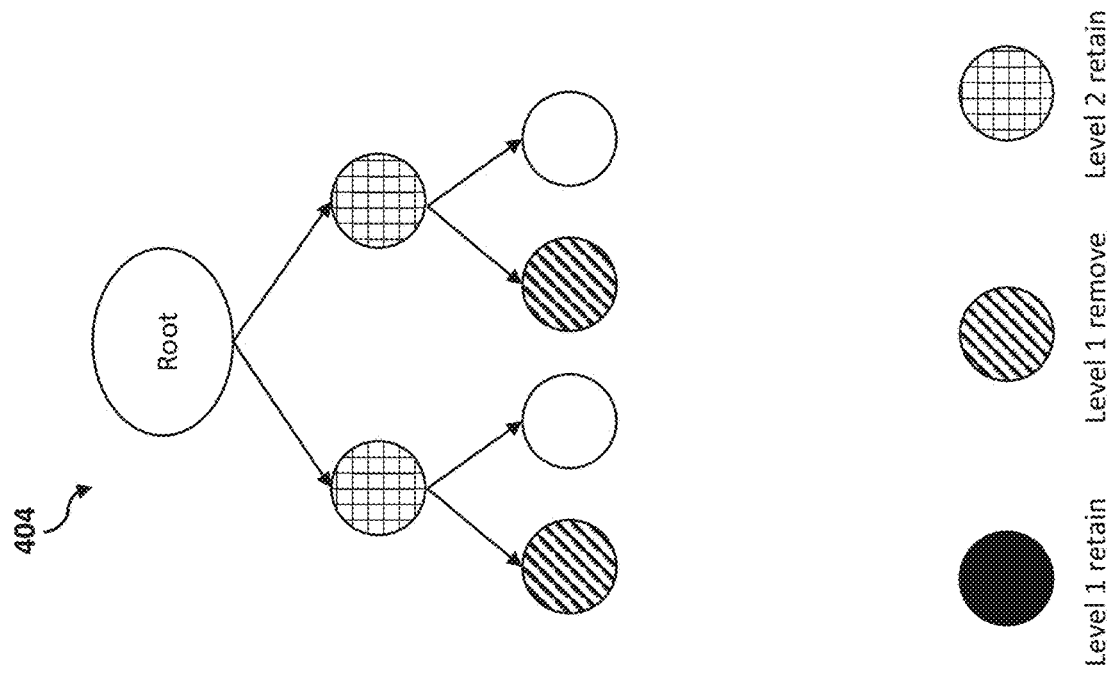
FIG. 4B is an exemplary illustration of a modified first DOM tree from a first scenario of the web element filtering process depicted in FIG. 3 according to at least one embodiment.
Figure 4A:
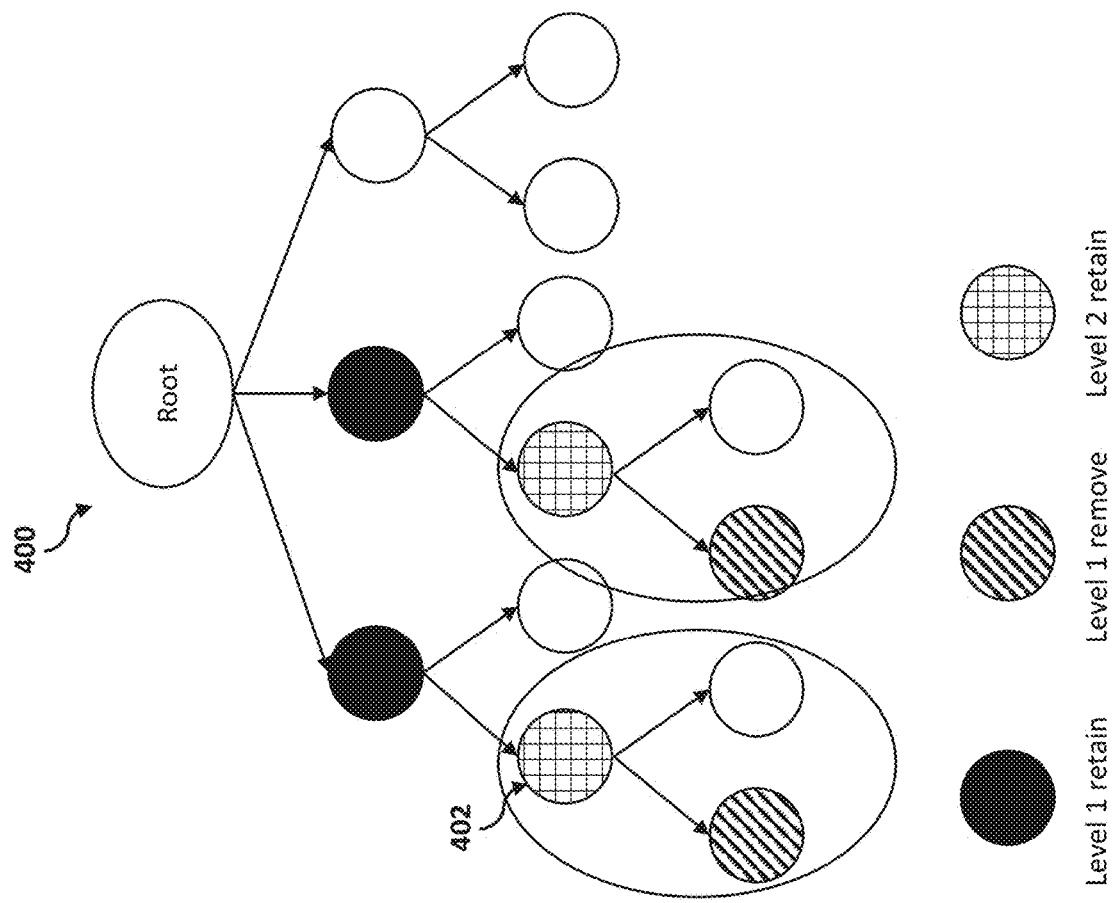
FIG. 4A is an exemplary illustration of a first DOM tree from a first scenario of the web element filtering process depicted in FIG. 3 according to at least one embodiment.

Referring now to FIG. 4A, an exemplary illustration of a first DOM tree 400 from a first scenario of the web element filtering process of FIG. 3 according to at least one embodiment is depicted. Dean, a user of a mobile device, selects a news article which is of interest to him on the New York Post webpage. Dean's press gesture is received by the plugin 204 on the browser 202 of his mobile device, as described previously at 302. The plugin 204 determines that the gesture is a press gesture as described previously at 304, and the plugin 204 will further identify the corresponding element on the first DOM tree 400. The pressed element is denoted at 402. The web element filtering program 110a, 110b stores the pressed element in temporary memory, as described previously at 304. Dean proceeds to shake his mobile device and the shake gesture is received by the web element filtering program 110a, 110b as described previously at 302. The plugin 204 determines that the gesture is a shake gesture, as described previously at 304, and prepares to filter unrelated elements. Since this is a well-formatted webpage with a clear DOM tree 206, the implementer of the web element filtering program 110a, 110b was able to configure Dean's plugin 204 to filter based on format of content appearing on the page (i.e., a photograph followed by a text box). Thereafter, elements with different attributes (e.g., modifiers of html element type) are filtered out of the first DOM tree 400, as described previously at 306. Elements with similar attributes and their children (e.g., the element's related nodes) are retained.

Referring now to FIG. 4B, a modified first DOM tree 404 from a first scenario of the web element filtering process of FIG. 3 according to at least one embodiment is depicted. The webpage will be re-rendered and will contain the news article that Dean selected, as well as other elements formatted in the photograph-and-text style mentioned above.

Figure 5B:
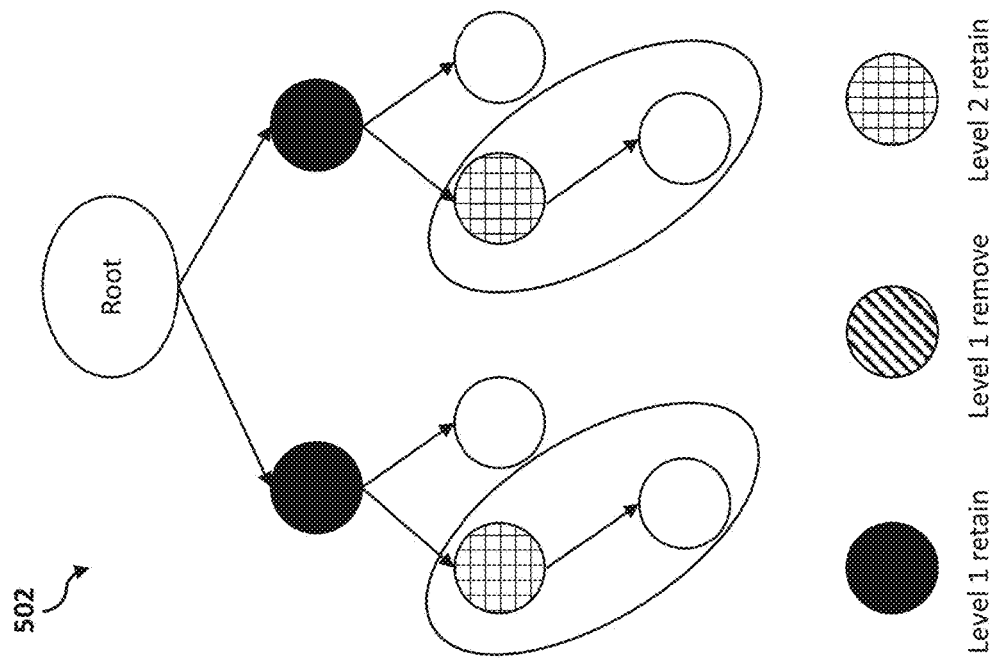
FIG. 5B is an exemplary illustration of a modified second DOM tree from a second scenario of the web element filtering process depicted in FIG. 3 according to at least one embodiment.
Figure 5A:
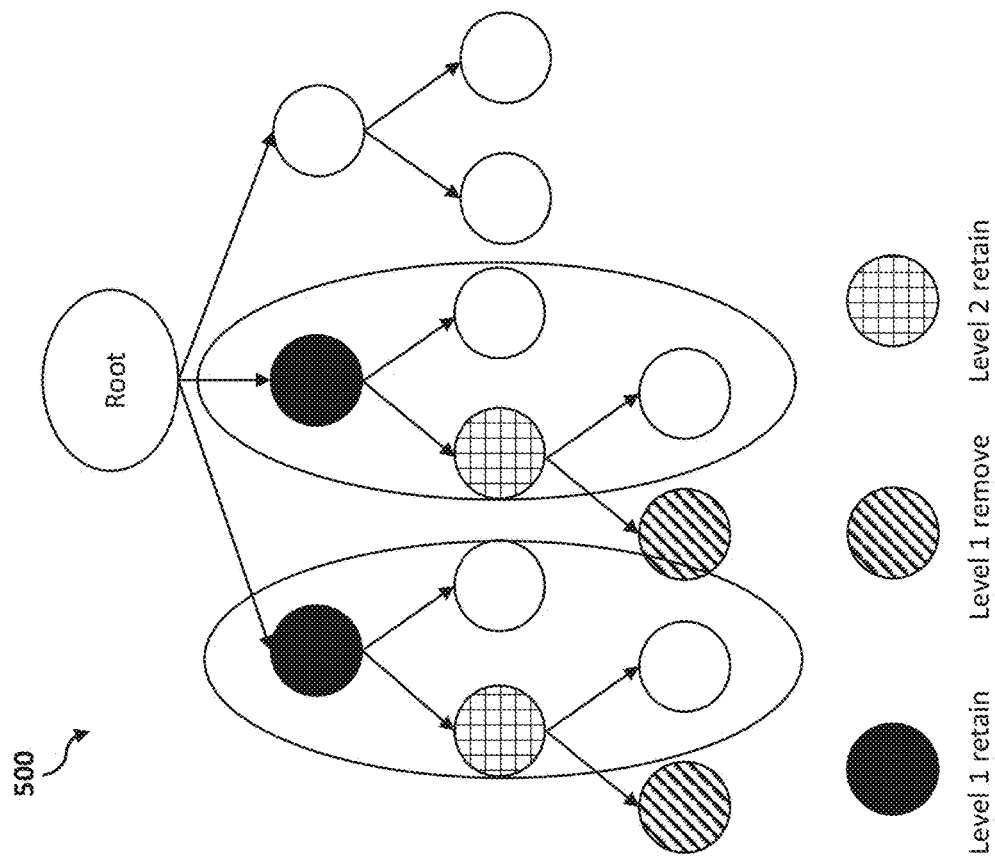
FIG. 5A is an exemplary illustration of a second DOM tree from a second scenario of the web element filtering process depicted in FIG. 3 according to at least one embodiment.

Referring now to FIG. 5A, an exemplary illustration of a second DOM tree 500 from a second scenario of the web element filtering process of FIG. 3 according to at least one embodiment is depicted. The second DOM tree 500 depicts a DOM tree 206 whereby the developer of the webpage has programmed filtering levels into the second DOM tree 500. The default filtering level of the web element filtering program 110a, 110b is 0. A shake gesture will increase the filtering level by 1, and a return gesture will decrease the filtering level to 0. The return gesture can also be configured to gradually decrease the filtering level with each iteration of the return gesture as described previously at 304. Each level of the second DOM tree 500 is configured with two attributes, indicating whether the elements should be retained or removed on a filter of that level (e.g., level 1 retain and level 1 remove).

When Dean, a user of a mobile device, selects an item on a webpage and proceeds to shake his mobile device, the plugin 204 on Dean's browser 202 will receive Dean's action as described previously at 302. The plugin 204 will determine that the action was a shake gesture as described previously at 304. Given this, the filtering level will increase by one. The filter of elements is based on the filtering level determined by the web element filtering program 110a, 110b. Since the filtering level defaulted to 0, the filtering level is now equal to one, and the web element filtering program 110a, 110b will remove all corresponding level 1 remove elements which were defined by the developer of the webpage within the corresponding second DOM tree 500. All level 1 retain elements and their children are retained by the second DOM tree 500. Children which were labeled level 1 remove are removed. The root node is retained to maintain the cascading style sheet (i.e., CSS) structure and does not contain any visible elements on the webpage. The second DOM tree 500 corresponding to the webpage Dean is viewing will contain those elements labeled level 1 retain and their children. The webpage is then re-rendered, as described previously at 308.

Referring now to FIG. 5B, an exemplary illustration of a modified second DOM tree 502 from a second scenario of the web element filtering process of FIG. 3 according to at least one embodiment is depicted. The modified second DOM tree 502 depicts the second DOM tree 500 after Dean's second element selection and shake. Elements labeled level 2 retain and their children will remain on the webpage after a re-rendering, along with the selected element.

Figure 6:
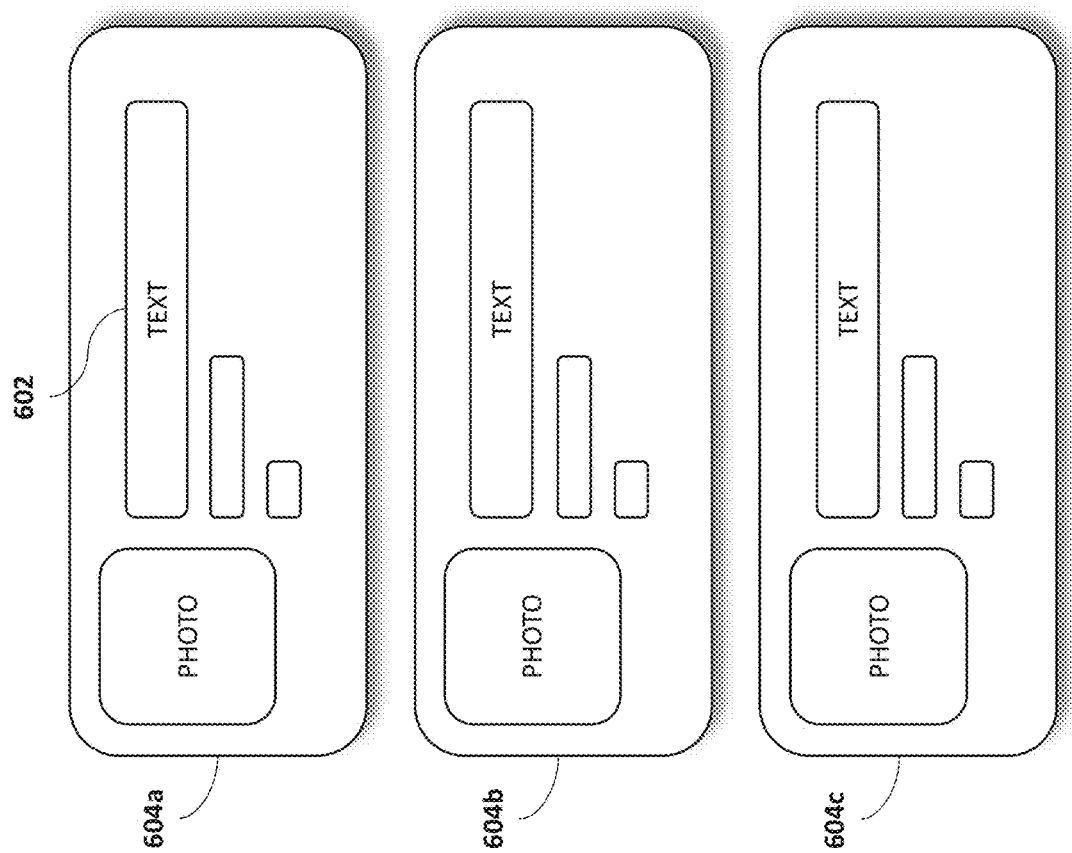
FIG. 6 is an exemplary illustration of a webpage viewed with the web element filtering process depicted in FIG. 3 according to at least one embodiment.

Referring now to FIG. 6, an exemplary illustration of a webpage 600 viewed with the web element filtering process of FIG. 3 according to at least one embodiment is depicted. The webpage 600 that Dean opens on his mobile device does not have a corresponding well-formatted DOM tree 206. Nevertheless, Dean selects the title 602 of an interesting news article on the webpage 600. The web element filtering program 110a, 110b installed on Dean's browser 202 will receive the press gesture as described previously at 302, and determine the requested action is a press gesture as described previously at 304. Dean subsequently shakes his mobile device. The web element filtering program 110a, 110b will receive the shake as described previously at 302, and determine that the gesture was a shake as described previously at 304. In response to the shake gesture, the web element filtering program 110a, 110b filters out unwanted elements as described previously at 306. However, since, as indicated above, the webpage 600 that Dean is viewing does not contain a well-formatted DOM tree 206, a graphic tree will be analyzed in this instance to identify elements based on shape. The graphic tree may be created from the html source code by searching the code for container units (i.e., designated by <div> tags) and placing the elements into a corresponding hierarchical tree structure.

In this instance, the web element filtering program 110a, 110b will identify container units 604b and 604c whose shapes mirror the container unit 604a that Dean selected. Containers 604a, 604b and 604c, which have a photograph and text, will remain on the webpage. All retained containers will have one image on the left side of the container and several text blocks on the right side. The webpage 600 will be re-rendered as described previously at 308 and Dean's screen on his mobile device will display the browser 202 containing the article 604a he selected as well as those articles 604b and 604c with similar container shape structures. Dean may continue to remove unwanted elements from the webpage 600 by repeating the pressing and shaking gestures, or he may bring back filtered out elements by using the return gesture.

Figure 7B:
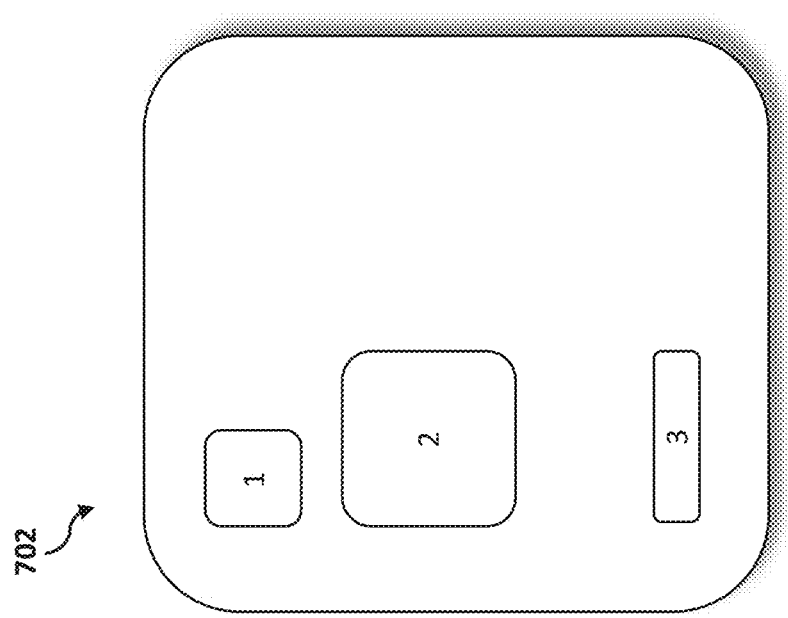
FIG. 7B is an exemplary illustration of a modified webpage displayed according to the third scenario of the web element filtering process depicted in FIG. 3 according to at least one embodiment.
Figure 7A:
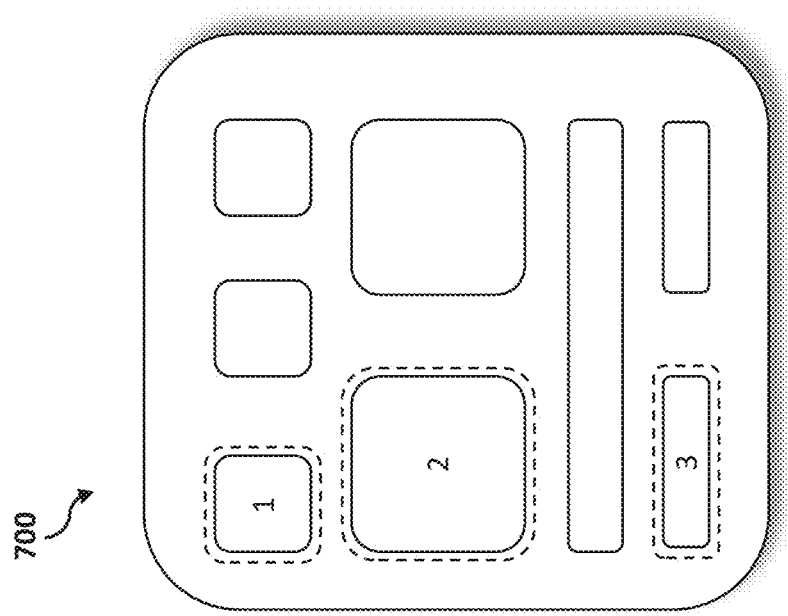
FIG. 7A is an exemplary illustration of a webpage displayed according to a third scenario of the web element filtering process depicted in FIG. 3 according to at least one embodiment.

Referring now to FIG. 7A, an exemplary illustration of a webpage 700 displayed according to a third scenario of the web element filtering process of FIG. 3 according to at least one embodiment is depicted. Dean views a webpage 700 and presses upon multiple elements on the webpage 700 to form an element group which he wishes to remain. The web element filtering program 110a, 110b installed on Dean's browser 202 will receive the press gesture as described previously at 302, and determine the requested action as described previously at 304. The elements Dean selects appear with a dotted border, allowing Dean to validate whether the selection understood by the web element filtering program 110a, 110b is correct. In this case, the selection appears correct, and Dean shakes his mobile device to filter out all other elements from the webpage. The web element filtering program 110a, 110b will receive the shake as described previously at 302, and determine that it was a shake as described previously at 304. The web element filtering program 110a, 110b will filter out all unwanted elements from the DOM tree 206 as described previously at 306 and re-render the webpage as described previously at 308.

Referring now to FIG. 7B, an exemplary illustration of a modified webpage 702 according to the third scenario of the web element filtering process of FIG. 3 according to at least one embodiment is depicted. The resulting modified webpage 702 contains only the selected element group(s) chosen by Dean. The elements remaining on Dean's mobile device can be enlarged to fit the size of the screen.

Figure 8B:
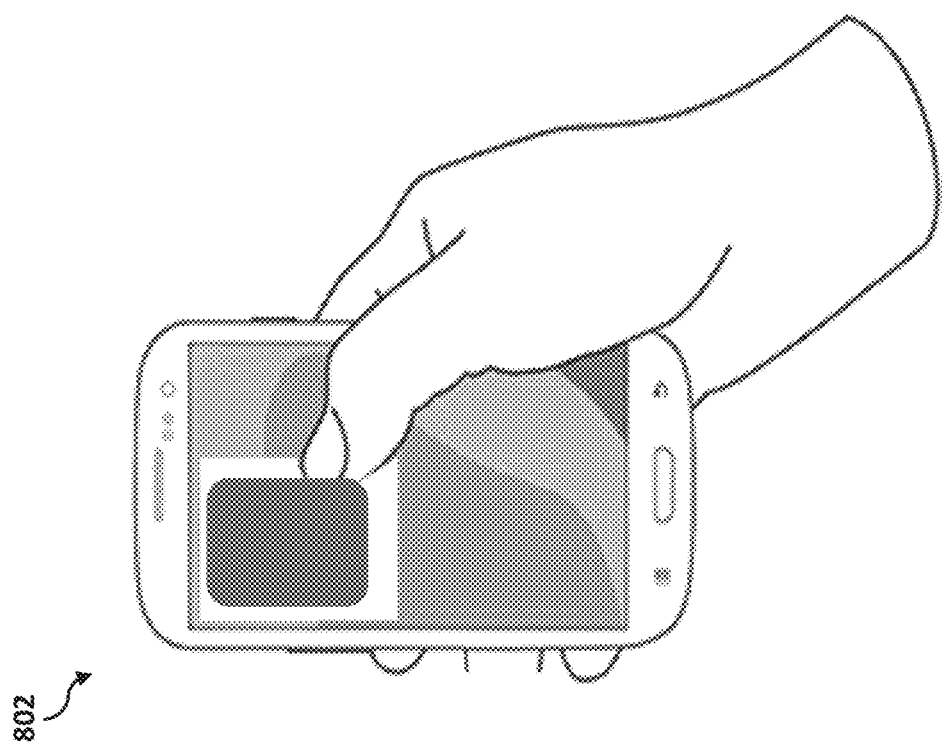
FIG. 8B is an exemplary illustration of a modified webpage resulting from the web element filtering process depicted in FIG. 3 according to at least one embodiment.
Figure 8A:
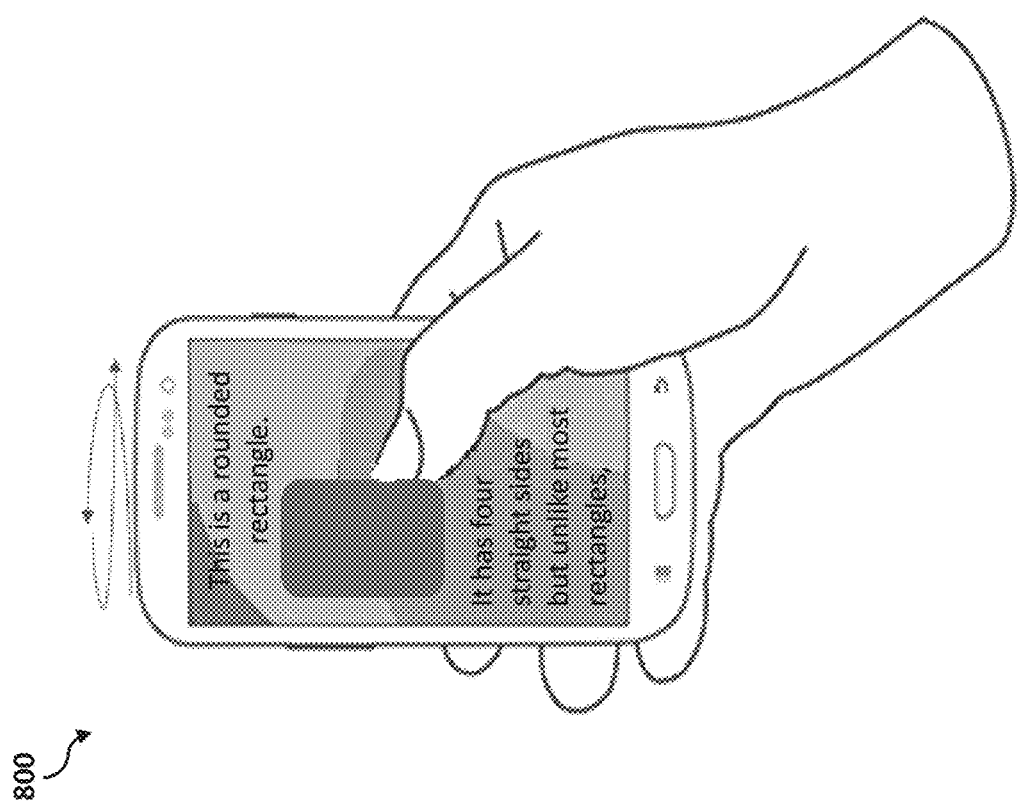
FIG. 8A is an exemplary illustration of a shake gesture used as input for the web element filtering process depicted in FIG. 3 according to at least one embodiment.

Referring now to FIG. 8A, an exemplary illustration 800 of a shake gesture used as input for the web element filtering process of FIG. 3 according to at least one embodiment is depicted. At 800, Dean selects the image depicted on the webpage and shakes his mobile device. The web element filtering program 110a, 110b receives the gestures as described previously at 302 and determines Dean's requested action as described previously at 304. Based on the plugin's 204 filter configuration, to eliminate all elements unlike those selected, all text is removed from the webpage as described previously at 306.

Referring now to FIG. 8B, an exemplary illustration 802 of a modified webpage resulting from the web element filtering process of FIG. 3 according to at least one embodiment is depicted. The webpage Dean is viewing is re-rendered as described previously at 308 and, once re-rendered, contains only the image that Dean selected.

It may be appreciated that FIGS. 2-8 provide only an illustration of several embodiments and do not imply any limitations with regard to how different embodiments may be implemented. Many modifications to the depicted embodiments may be made based on design and implementation requirements.

Figure 9:
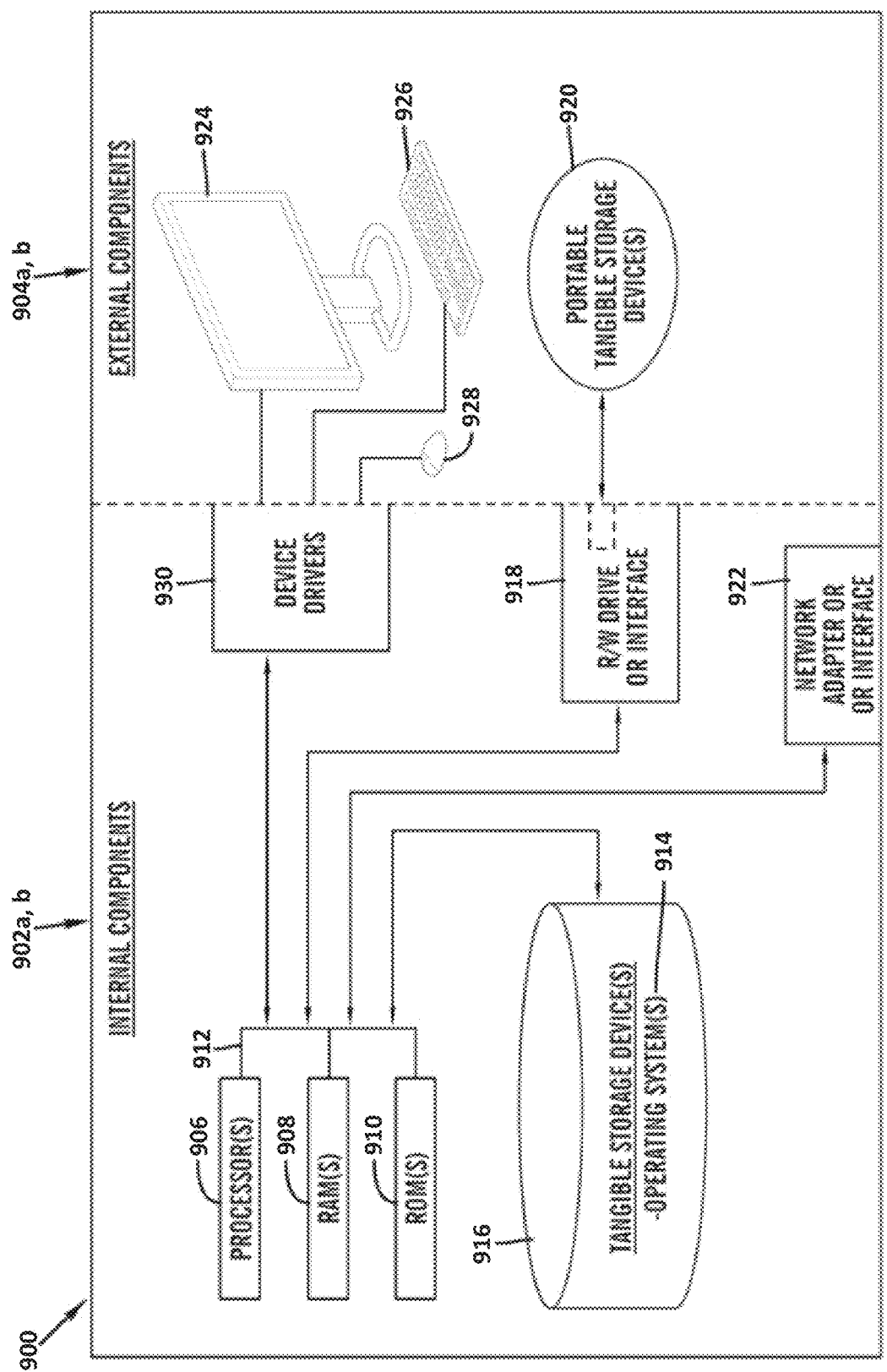
FIG. 9 is a block diagram of internal and external components of computers and servers depicted in FIG. 1 according to at least one embodiment.

FIG. 9 is a block diagram 900 of internal and external components of computers depicted in FIG. 1 in accordance with an illustrative embodiment of the present invention. It should be appreciated that FIG. 9 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 9. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the web element filtering program 110a in client computer 102, and the web element filtering program 110b in network server 112, may be stored on one or more computer-readable tangible storage devices 916 for execution by one or more processors 906 via one or more RAMs 908 (which typically include cache memory). In the embodiment illustrated in FIG. 9, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the web element filtering program 110*a* and 110*b* can be stored on one or more of the respective portable computer-readable tangible storage devices 920, read via the respective R/W drive or interface 918, and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the web element filtering program 110*a* in client computer 102 and the web element filtering program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the web element filtering program 110*a* in client computer 102 and the web element filtering program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
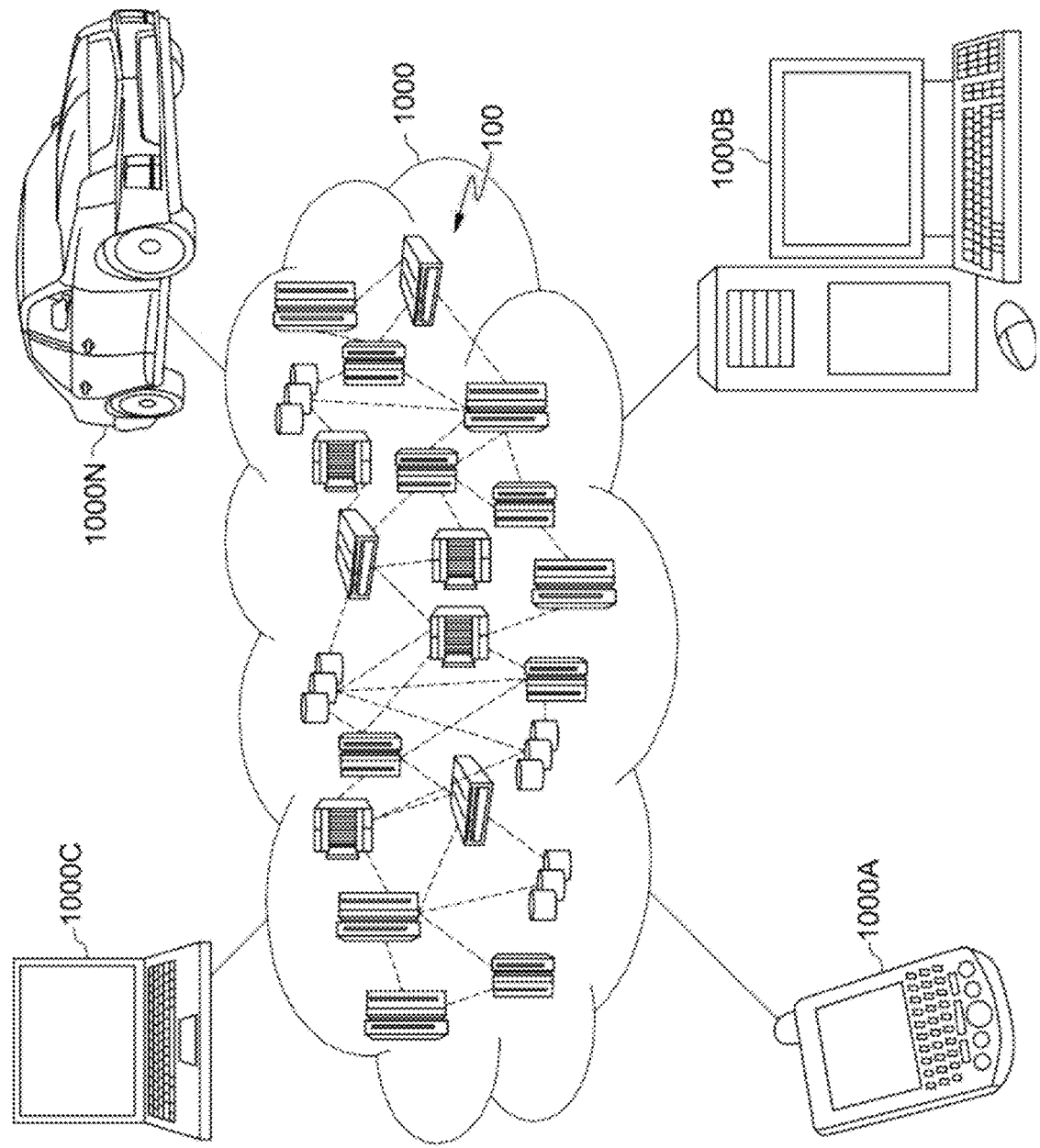
FIG. 10 is a block diagram of an illustrative cloud computing environment including the computer system depicted in FIG. 1, in accordance with an embodiment of the present disclosure.

Referring now to FIG. 10, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 10 are intended to be illustrative only and that computing nodes 100 and cloud computing environment 1000 can communicate with any type of computerized device over any type of network and/or network addressable connection (e.g., using a web browser).

Figure 11:
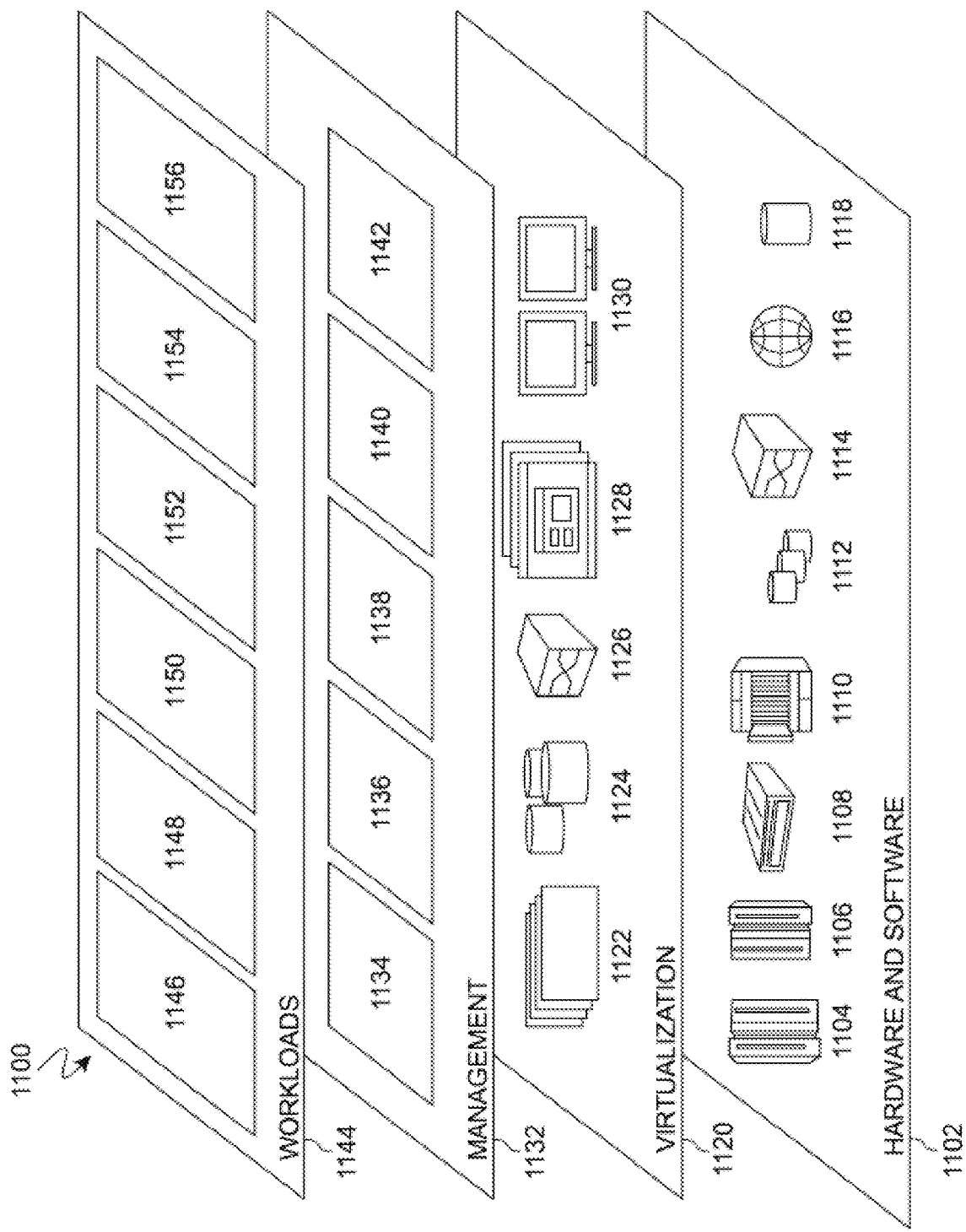
FIG. 11 is a block diagram of functional layers of the illustrative cloud computing environment of FIG. 10, in accordance with an embodiment of the present disclosure.

Referring now to FIG. 11, a set of functional abstraction layers 1100 provided by cloud computing environment 1000 is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and web element filtering 1156. A web element filtering program 110a, 110b provides a way to manually or automatically filter unwanted elements from a webpage based on a user's selection of desirable content.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for filtering at least one element, the method comprising:
   receiving a first user gesture and a second user gesture, wherein the first user gesture is a press gesture and the second user gesture is a shake gesture;
   determining a requested action based on the first user gesture, wherein the determined requested action is identifying a pressed portion of a Document Object Model (DOM) tree structure, and wherein the pressed portion of the DOM tree structure is a photograph followed by a text box;
   storing all portions of the DOM tree whose parent-child node relationship is identical to the pressed portion of the DOM tree in a temporary memory location;
   filtering at least one element associated with a webpage based on the determined requested action and the shake gesture;
   increasing a filtering level by 1;
   generating a modified DOM tree eliminating at least one unwanted element from the generated DOM tree structure which is not stored in the temporary memory location and which is based on the increased filtering level; and
   rendering a modified webpage based on the filtered at least one element, wherein rendering the modified webpage includes generating a modified DOM tree and the modified DOM tree, wherein the modified webpage includes the photograph followed by the text box.

2. The method of claim 1, further comprising:
   obtaining a plurality of source code associated with the webpage from a browser; and
   generating a Document Object Model (DOM) tree based on the obtained plurality of source code, wherein each level of the generated DOM tree is configured, by a developer of the webpage, with two attributes, indicating whether the at least one element associated with the webpage will be retained or removed on a filter of that level.

3. The method of claim 2, further comprising:
identifying a portion of the generated DOM tree affected by the press gesture; and
storing the identified portion of the generated DOM tree in temporary memory.

4. The method of claim 3, wherein generating the modified DOM tree further comprises eliminating the at least one unwanted element from the generated DOM tree which is not stored in temporary memory or determined to be equivalent to the at least one unwanted element stored in temporary memory based on a predefined filtering category based on receiving the shake gesture.

5. The method of claim 4, wherein the modified webpage is based on the modified DOM tree.

6. The method of claim 5, further comprising:
receiving a third user gesture;
determining that the third user gesture was a return gesture, configured to gradually decrease a filtering level with each iteration of the return gesture; and
deleting the identified portion of the DOM tree from temporary memory based on determining the third gesture was the return gesture.

7. The method of claim 6, wherein the predefined filtering category is selected from the group consisting of a shape category, an attribute category and a filtering level category.

\* \* \* \* \*